No. 820,402. PATENTED MAY 15, 1906.
O. DION.
SAW SWAGE.
APPLICATION FILED AUG. 4, 1904.
2 SHEETS—SHEET 1.
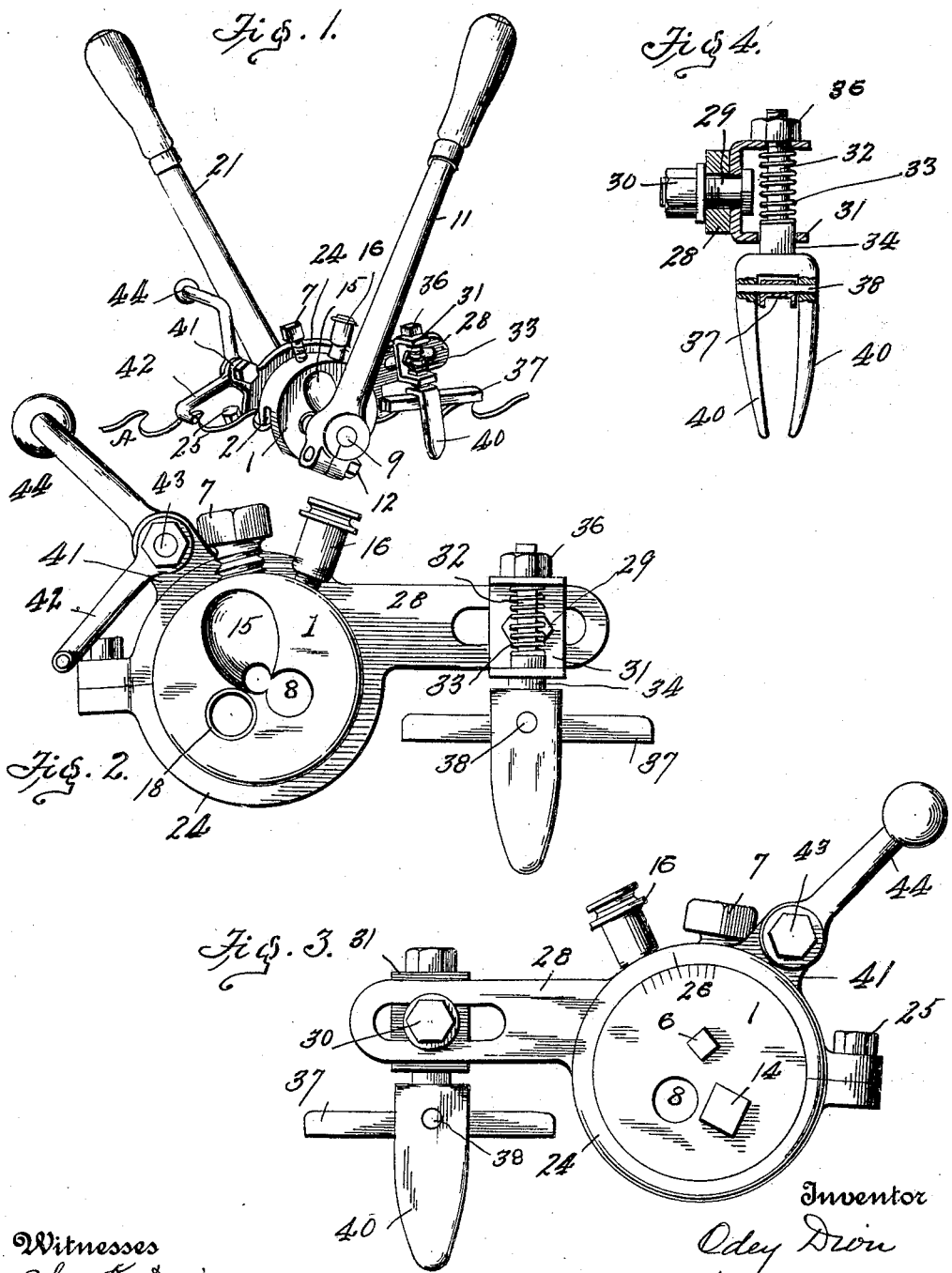
Witnesses
Chas. K. Davis.
M. E. Brown.
Inventor
Odey Dion
by W. A. Bartlett
Attorney

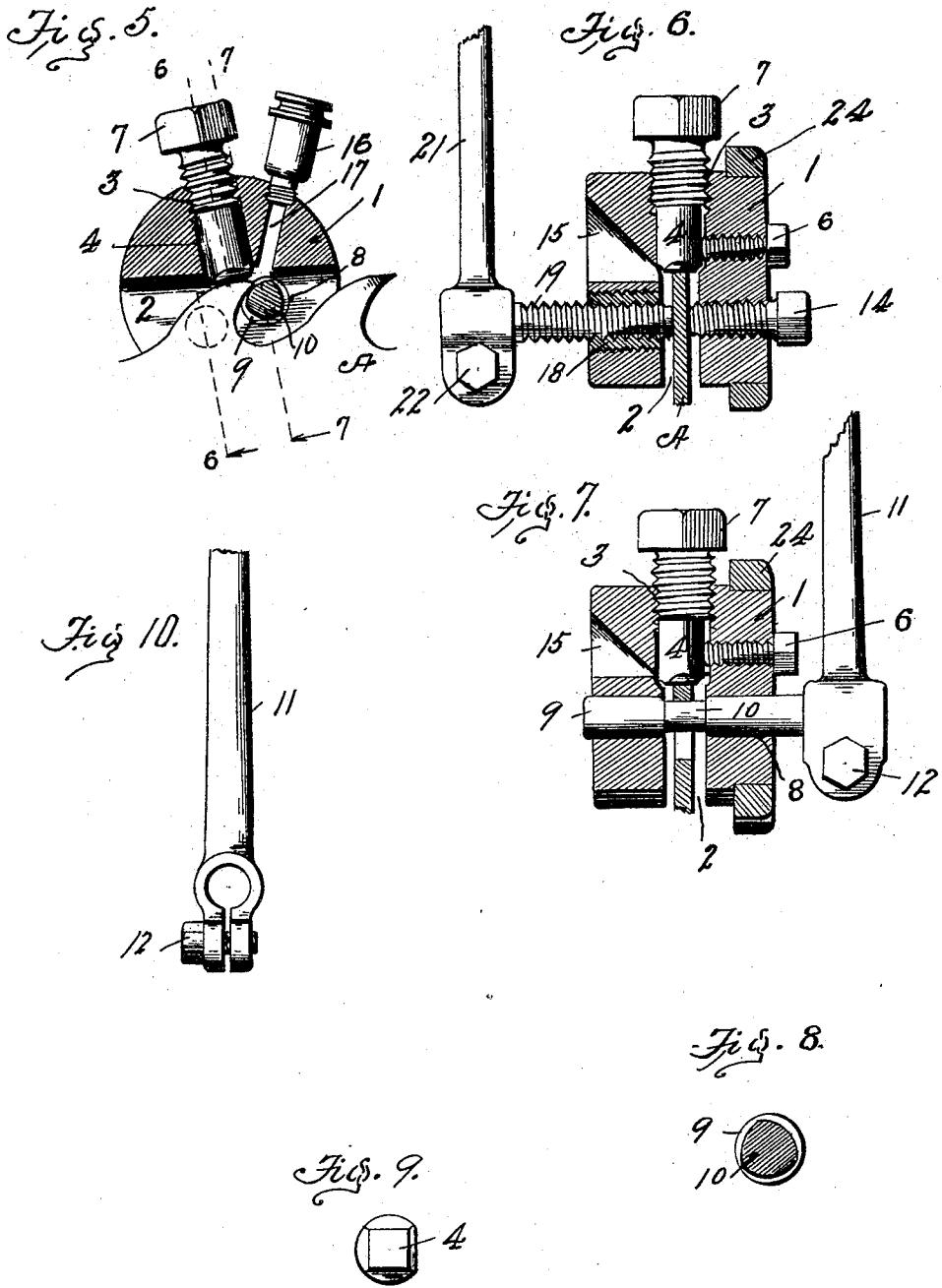

UNITED STATES PATENT OFFICE.

ODEY DION, OF PORTLAND, OREGON.

SAW-SWAGE.

No. 820,402.  Specification of Letters Patent.  Patented May 15, 1906.

Application filed August 4, 1904. Serial No. 219,519.

*To all whom it may concern:*

Be it known that I, ODEY DION, a citizen of the United States, residing at Portland, in the county of Multnomah and State of Oregon, have invented certain new and useful Improvements in Saw-Swages, of which the following is a specification.

The invention relates to saw-swages.

The object of the invention is to improve the construction of swages used in swaging band, circular, or other saw teeth.

The invention consists in certain improvements in the construction of parts and in the combination of elements which go to make up the saw-swage, as will be pointed out in the claim.

Figure 1 is a perspective view of the saw-swage or swaging-machine as applied to the teeth of a saw. Fig. 2 is an enlarged side elevation of the saw-swage, omitting levers and attachments. Fig. 3 is a reverse side elevation of Fig. 1 with rear gage omitted. Fig. 4 is a front elevation through the supporting-bar of the front gage. Fig. 5 is a broken longitudinal section of the frame or head and some of its attachments as applied to saw-teeth. Fig. 6 is a cross-section of the head and some of its attachments, including tooth-clamp, on line 6 6, Fig. 5. Fig. 7 is a cross-section on line 7 7, Fig. 5. Fig. 8 is a cross-section of the swaging-cam. Fig. 9 is an end view of the anvil. Fig. 10 is a broken elevation of one of the hand-levers attached to a screw or spindle.

The numeral 1 indicates the head or frame to which the other parts of the swage are connected. This head is a short cylindrical casting, having a slot or groove 2 extending transversely to the axis of the head, in which slot the saw-blade A is placed in the operation of swaging. The head has a threaded bore 3 extending about radially of the head from the outside to the slot 2. In this bore an anvil 4 is placed. The anvil 4 is preferably flattened on one side and is held against turning in the bore 3 by a set-screw 6, bearing against the flattened side of the anvil. Screw 6 extends through a threaded bore in the head 1. The anvil 4 is held down by a retaining-screw 7, bearing on top of the anvil and adjustable in the bore 3 of the head. The anvil is of hardened steel and can be extended more or less into slot 2 of the head as desirable.

A cylindrical bore 8 extends through the head 1 parallel with the axis of said head and passing through the notch 2 of said head. In this bore a spindle 9 has its bearings. Said spindle is dressed off to cam shape in the slot of the head, as indicated at 10, Fig. 8. The exact shape of the cam depends on the character of the work. The cam is almost immediately below anvil 4, and by the rotation of the cam a saw-tooth is swaged between the cam and anvil. (See Fig. 5.) The spindle 9 has a lever or handle 11 attached, and this handle serves as a means for rotating cam 10. The spindle 9 can be easily removed and replaced in head 1. The spindle may slide longitudinally in its bearing, so as to bring other parts of the cam under the anvil 4 in the head. The spindle 9 is held in split handle 11 by a set-screw 12, so that the spindle can be rotated and the cam adjusted. Such adjustment of hand-levers is common. Several cam-spindles may be used, being changeable as desired. A tapered opening 15 in one end of the head 1 allows the operator to see the work from outside, and the opening serves as a vernier sight-gage for the adjustment of the anvil 4 and the cam 10 for the accurate performance of the work, as the tapered opening always has its terminal face at an angle to the teeth of the saw and slight deviations can be observed by sighting down the inclined face of said opening from various points of view. An oil-cup 16, connected to the head, has a passage 17 for oil, terminating in the head 1 just above the position of the cam 10. Lubricant is thus automatically fed to the cam when in operation.

There is a clamp-screw 14 extending from one end of the head 1 into the slot 2. This clamp-screw can be adjusted in usual manner. Directly on line with the clamp-screw 14 there is a threaded hole at the other side of slot 2, and a hardened bushing 18 screws into the hole. A clamp-screw 19 is threaded through the bushing and is operated by the hand-lever 21, which is split and adjustably secured to screw 19 by set-screw 22. Thus the clamp-screws 14 and 19 can be adjusted to such relation to each other that they are ready to clamp a saw-tooth, as in Fig. 6, with a slight movement of lever 21. This lever 21 holds against the pressure of lever 11, which swages the adjacent tooth. The pressure applied to levers 11 and 21 is in practically opposite directions, and the entire machine can be very quickly clamped and operated to swage a tooth by a movement of the two hands of the operator, grasping the levers 11 and 21 as common. The head 1 is held in a clamping-band 24 and can be rotatively adjusted and held in said band by the adjustment of set-screw 25. An index 26 on the head and clamping-band shows the extent of such adjustment.

Band 24 has a rigid arm 28 projecting forward. This arm 28 is slotted, and a bolt 29 is adjustable in said slot, being held in adjusted position by nut 30. Bolt 29 passes through a yoke 31, binding said yoke to arm 28. Through holes in this yoke 31 a spindle 32 extends, and the spindle 32 is surrounded by a coiled spring 33. The upper end of this spring bears against the upper bar of yoke 31, and the lower end of the spring 33 bears on a shoulder 34 of said spindle 32, pressing the spindle downward. A nut 36 prevents the escape of the spindle by engaging a thread thereon above yoke 31. The lower end of spindle 32 is forked. Within the fork there is a trough 37, held to the fork by a pivot 38. The trough rests on top of a number of teeth of a saw, and being free to turn on pin or pivot 38 adjusts itself to the position of such teeth whether their points be in line, as on a band-saw, or on a curve, as in a circular saw. The forked ends 40 of spindle 32 extend down alongside of the saw-blade, and the sides of slot 2 in head 1 also straddle the saw-blade. Thus the machine is held quite securely to the saw-blade whether the clamp 14 19 is compressed or not. The trough 37 and spindle 32 and attachments form the front gage or rest of the swaging-machine. An arm 41 extends rigidly from band 24 in rear of the swage. This arm 41 has a rear gage 42 attached by means of a bolt 43, passing through the gage and arm, and the gage is secured by a crank-nut 44. The rear gage can be easily adjusted to position, so as to rest on a tooth in rear of the tooth which is being swaged, as in Fig. 1.

The operation of my swaging-machine will be generally understood from the foregoing description. The saw is held firmly in any suitable and usual way. The machine is applied thereto as indicated, the rear gage 42 being carefully adjusted and the front gage approximately so. The trough of the front gage adjusts itself, and the spindle yields for slight inequalities in the teeth. The front gage is adjustable to all forms of saws in common use by means of the mechanism described. In operation the work is open to observation through hole 15, and the cam and anvil can be carefully adjusted by observation at the same place.

What I claim is—

The combination with a slotted head having an anvil and a cam carried by the head, of a band rotatably adjustable about said head, arms connected to said band in front and rear of the head, and separate gages to rest on the saw-teeth, adjustably connected to said arms.

In testimony whereof I affix my signature in presence of two witnesses.

ODEY DION.

Witnesses:
RICHARD C. BRANCH,
JOHN T. WHEATMAN.